April 20, 1937.  P. H. CRARY  2,077,618

FLUID PRESSURE ENGINE

Filed Dec. 3, 1932

Inventor

Palmer H. Crary

By Lloyd W. Patch

Attorney

Patented Apr. 20, 1937

2,077,618

UNITED STATES PATENT OFFICE 2,077,618

FLUID PRESSURE ENGINE

Palmer H. Crary, Coconut Grove, Fla., assignor of ten per cent to Robert A. Wright, Rye, N. Y., and one-third to Margaret E. Crary, Hialeah, Fla.

Application December 3, 1932, Serial No. 645,619

3 Claims. (Cl. 121—122)

My invention relates to fluid power units, and particularly to a device of this character operated by compressed air.

An object of this invention is to provide a motor structure, in the form of an air engine, the operation of which is controllable by varying the time of fluid supply to the cylinders.

Another object is to provide a power unit of this nature which is so constructed that maximum efficiency and power are obtained from the compressed air as used.

Still another purpose of this invention is to so construct and connect the parts of the unit that a proper supply of air under pressure will be maintained available at all times.

With the above and other objects in view, which will be apparent to those skilled in the art, my invention includes certain novel features of construction and combinations of parts which will be hereinafter set forth in connection with the drawing and then pointed out in the claims.

Figure 1:
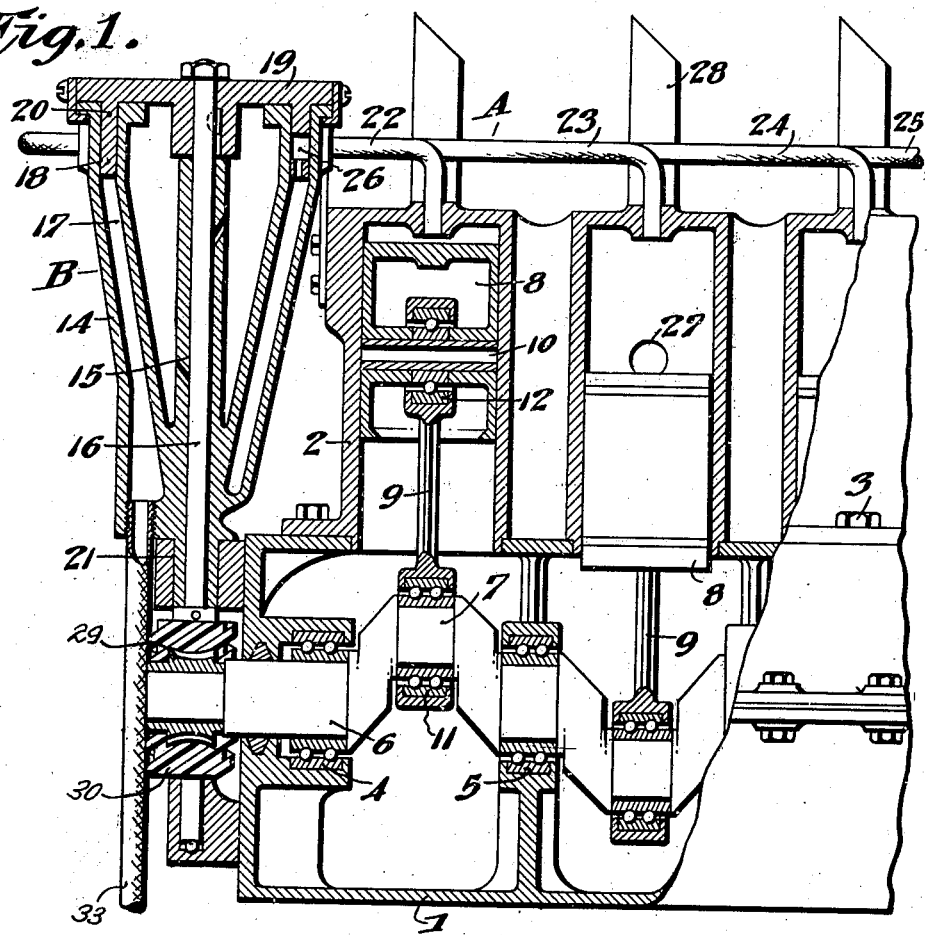
Figure 1 is a fragmentary view of one end of an air engine illustrating an embodiment of my invention and showing parts of the structure in vertical section.

In the present embodiment the air engine is generally indicated at A, the distributor at B being supplied with compressed air from any suitable source.

The engine A has the base 1 thereof constructed somewhat after the manner of the crank case of an internal combustion engine, seats being provided for the cylinders 2, of which any number can be used, so that the cylinders can be secured in rigid mounting upon the base structure 1 by means of cap bolts 3, or other suitable fastenings. The base 1 has at its ends main crank shaft bearings 4, and additional intermediate crank shaft bearings 5 can also be provided to be spaced between the cylinders 2.

It is preferable that these bearings 4 and 5 be constructed as ball bearings, to thus reduce friction to a minimum, and the crank shaft 6 mounted in these bearings 4 and 5 has cranks 7 thereof substantially centered with respect to the bore of the respective cylinders 2. Pistons 8 are fitted to reciprocate within the cylinders 2 and are preferably provided with suitable packing rings to hold fluid leakage and losses past the pistons down to a minimum. It is preferable that these pistons have the rings distributed toward the ends of the pistons and made sufficiently resilient or soft in their action so that frictional losses will be reduced to a minimum, consistent with adequate sealing against fluid pressure losses. Connecting rods 9 are fitted upon the crank pins 7 and upon wrist pins 10 carried by the pistons and it is perhaps preferable that ball bearings 11 and 12, or other suitable anti-friction bearings be provided to hold frictional losses down to a minimum.

While no particular arrangement of the radial and relative disposition of the crank arms of shaft 6 is contemplated, during the operation of the air engine compressed air will be supplied to the various cylinders 2 in serial order, and therefore the crank shaft will be so construced that the operation will be balanced and revolved to secure maximum power and efficiency with the compressed air as used. To aid in maintaining constant and even rotation of the crank shaft 6 it is preferable that a fly wheel be provided thereon.

The distributor B, which will have a supply of compressed air constantly maintained thereto, has the case 14 thereof provided with a central bearing 15 in which shaft 16 is rotatably mounted. A compressed air case 17 surrounds the bearing 15 and terminates at its upper end in an annular seat portion 18. A distributor head 19 is mounted and fixed on the upper end of shaft 16 with a flange 20 rotatably received within the annular upper end of the compressed air case 17 within the seat portion 18. This distributor casing is preferably held in bearing 21 for slight oscillatory and adjusting movement substantially around the axis of rotation of shaft 16. Air conducting tubes 22, 23, 24 and 25 are connected with the seat portion 18 of the casing 14 at equally spaced points around the portion occupied by the flange 20 of the head 19, and as these conduits are somewhat flexible the casing 14 is still free to have slight oscillatory movement sufficient to accomplish desired adjustments of intervals of injection of compressed air.

The flange 20 has a port or passage 26 formed therein and as the shaft 16 is rotated and head 19 is revolved the flange 20 will rotate within the seat portion 18 and the port or passage 26 will establish communication serially to each of the flexible conduits 22, 23, 24 and 25, during each complete rotation of the head. These several conduits are connected with the upper ends of the several cylinders and the relative points of connection of the intake ends of the conduits around the distributor case 14 will be made according to the power impulse arrangement and sequence desired for the respective cylinders.

Exhaust ports 27 are provided to open through the side walls of the several cylinders 2 at points to be uncovered only when the piston is substantially at the end of its in stroke or power stroke, and the compressed air will sweep forward with the piston and will exhaust through this port as the end of the power stroke is reached. Exhaust pipes 28 can be connected with the exhaust ports so that the spent air will exhaust into the atmosphere at any desired point, or these pipes 28 can be individually led or can be manifolded and then extended to discharge where desired as is now well known practice.

Figure 2:
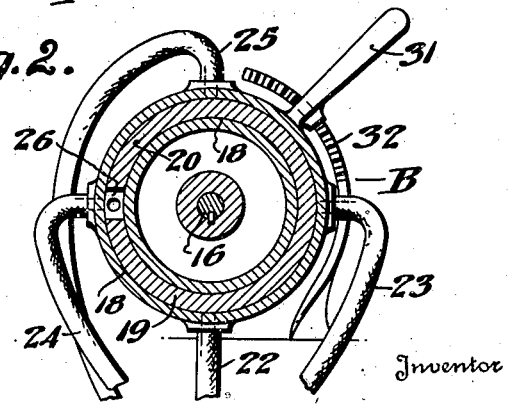
Fig. 2 is a transverse sectional view through the fluid distributor case and rotor adjacent to the head.

The distributor head 19 must rotate in fixed relation and proportion to the crank shaft 6, and with this in mind a gear 29 on crank shaft 6 is provided to mesh with gear 30 on distributor shaft 16. In the present instance I have illustrated the distributor head, in Fig. 2, as being constructed with a single air supply port, and consequently the distributor head must make one complete revolution for each revolution of the crank shaft 6. To hold the distributor case 14 in desired adjusted positions, any suitable means might be employed, but in the present instance I have illustrated a handle or lever 31 as connected with the case 14 to extend laterally and to be manually manipulated to vary the settings of the case 14, a segmental rack 32 being provided to hold the desired adjustments.

Air under pressure, or other suitable motive fluid, is supplied to the casing 14 through a flexible supply pipe 33, from a pump, tank, or other suitable source of fluid pressure. The supply of fluid through this pipe 33 can be controlled by use of a valve, or in any other desired manner, and as such control means is old and well known no attempt is here made to illustrate or particularly describe such constructions.

From the foregoing it will be seen that I have provided a fluid power unit in which an air engine is efficiently operated by the use of compressed air and the supply of compressed air can be controlled, as to the interval of injection, to thus control the operation of the engine.

While I have herein shown and described only certain specific embodiments of my invention and have suggested only certain possible modifications and variations in the form, construction, assembly, operation and adjustment of the parts, it will be appreciated that other changes and variations can be made without departing from the spirit and scope of my invention.

I claim:

1. A fluid power unit comprising, with a multiple cylinder air engine structure, a distributing case adjustably mounted, a distributor rotor fitted to said case and connected to be rotated by operation of the air engine, flexible air conducting connections from spaced points around said distributor case to each of said cylinders, a compressed air supply connection to said distributor case, said rotor having a delivery port to deliver compressed air serially to said air conducting connections as the rotor is rotated, and manually actuatable means to move said distributor case to adjust the instant of supply of air to the cylinders of the air engine to advance and retard the instant of introduction of air relative to movement of the pistons of the engine.

2. With a multiple cylinder air engine, a distributor case adjustably mounted for oscillatory movement and provided with an outlet port for each of the cylinders of the engine, a compressed air supply connection to said distributor case, flexible connections from said outlet ports to the engine cylinders, a distributor rotor revolvably fitted within the distributor case, a driving connection from said engine to the rotor, said outlet ports being spaced around the distributor case and the rotor being provided with a single port to register serially with the spaced outlet ports as the rotor is rotated, and means to oscillate and adjust said distributor case to retard and advance the time of introduction of air into the cylinders through said flexible connections.

3. With a multiple cylinder air engine, a distributor case provided with an annular compressed air chamber having a number of outlets corresponding to the number of cylinders and opening at spaced points around the outer periphery of the annular chamber, a compressed air supply connection to said distributor case, a rotor ring revolvably mounted within the annular chamber and provided with an air supply port to register successively with the outlet passages upon the distributor case, a driving connection from the air engine to revolve said rotor ring, flexible connections from the openings of the distributor case to the cylinder of the air engine, and manually actuatable means to turn and oscillate said distributor case to advance and retard and thus vary the time of introduction of the air into the cylinders.

PALMER H. CRARY.